(12) United States Patent
Plotnikov et al.

(10) Patent No.: US 8,785,356 B2
(45) Date of Patent: Jul. 22, 2014

(54) METHOD FOR THE PRODUCTION OF A LIGHTWEIGHT MAGNESIUM SILICATE PROPPANT AND A PROPPANT

(75) Inventors: Vasily Alexandrovich Plotnikov, Sverdlovskaya Oblast (RU); Eugeny Vasilyevich Rozhkov, Yekaterinburg (RU); Viktor Georgiyevich Peychev, Yekaterinburg (RU); Sergey Fedorovich Shmotyev, Yekaterinburg (RU); Sergey Yuryevich Pliner, Yekaterinburg (RU); Vyacheslav Mikhaylovich Sychev, Yekaterinburg (RU)

(73) Assignee: Obshchestvo s ogranichennoy otvetstvennostyu "FORES" (OOO "FORES"), Yekaterinburg (RU)

( * ) Notice: Subject to any disclaimer, the term of this patent is extended or adjusted under 35 U.S.C. 154(b) by 693 days.

(21) Appl. No.: 13/152,693

(22) Filed: Jun. 3, 2011

(65) Prior Publication Data

US 2011/0301067 A1    Dec. 8, 2011

(30) Foreign Application Priority Data

Jun. 3, 2010  (RU) ................................ 2010122755

(51) Int. Cl.
| | | |
|---|---|---|
| *B22C 1/00* | (2006.01) | |
| *C09K 8/80* | (2006.01) | |
| *C04B 35/626* | (2006.01) | |
| *C04B 35/20* | (2006.01) | |

(52) U.S. Cl.
CPC .............. *C09K 8/80* (2013.01); C04B 2235/96 (2013.01); C04B 2235/3463 (2013.01); C04B 2235/77 (2013.01); *C04B 35/6261* (2013.01); *C04B 35/62695* (2013.01); C04B 2235/5436 (2013.01); C04B 2235/3445 (2013.01); *C04B 35/20* (2013.01); C04B 2235/656 (2013.01); C04B 2235/3418 (2013.01)
USPC ................. 507/269; 65/376; 501/72

(58) Field of Classification Search
USPC ................. 507/269; 65/376; 501/72
See application file for complete search history.

(56) References Cited

U.S. PATENT DOCUMENTS

| 6,627,568 | B2 * | 9/2003 | Kusuno et al. | 501/36 |
|---|---|---|---|---|
| 2002/0068677 | A1 * | 6/2002 | Crosbie | 501/32 |
| 2006/0090876 | A1 * | 5/2006 | Sakaguchi et al. | 164/529 |
| 2009/0192059 | A1 * | 7/2009 | Shmotev et al. | 507/271 |

FOREIGN PATENT DOCUMENTS

| RU | 2235702 C2 | 9/2004 |
|---|---|---|
| RU | 2235703 C1 | 9/2004 |

OTHER PUBLICATIONS

English Patent Abstract of RU 2163227, Publication Date Feb. 20, 2000 (1 page).
English Patent Abstract of RU 2191169, Publication Date Oct. 20, 2002 (1 page).

* cited by examiner

*Primary Examiner* — Margaret Moore
(74) *Attorney, Agent, or Firm* — Osha Liang LLP

(57) ABSTRACT

The invention relates to oil and gas industry, i.e. techniques for making proppants designed to be used as propping agents in oil and gas recovery by the method of formation hydraulic fracturing. A method for the production of a lightweight magnesium silicate proppant, the method comprises heat processing of a magnesium-containing component—a source of magnesium oxide, its co-grinding with a silica-containing component, pelletizing of the batch prepared, sintering and sieving of the pellets prepared, wherein the batch comprises (in terms of calcined substance), in % by weight: $SiO_2$-64-72, MgO-11-18, natural impurities—remainder, wherein the heat processing is carried out at temperature not more than 1080 degrees C. A lightweight magnesium silicate proppant is characterized in that the proppant is produced by said method. At least one of the group: serpentine, brucite, caustic magnesite, talc may be used said magnesium-containing component. Said components may comprise serpentine gravel and quartz-feldspar sand at the following ratio, wt. %: serpentine gravel—30-40, quartz-feldspar sand—60-70. The sintering is performed at temperature 1140-1190 degrees C.

8 Claims, No Drawings

METHOD FOR THE PRODUCTION OF A LIGHTWEIGHT MAGNESIUM SILICATE PROPPANT AND A PROPPANT

The invention relates to oil and gas industry, i.e. techniques for making proppants designed to be used as propping agents in oil and gas recovery by the method of formation hydraulic fracturing.

Proppants are solid spherical granules (pellets) propping hydraulic fractures open under high pressure and ensuring proper oil and gas well production rate by means of conductive channels provided in the formation. The most applicable are ceramic proppants because by their basic technical characteristics they have bigger advantages over other types of propping agents used for hydraulic fracturing. However for economical reasons their use is limited and in case of large volumes resin-coated round silica sand is applied. In this respect it is vital to search for cheaper natural raw materials to provide proppants with appropriate operating characteristics. The magnesium silicate proppants—the raw materials for which are up to 15% of the components of the Earth crust—are a focus of special attention. In addition the use of magnesium silicate raw materials enables to make proppants having low bulk density. Reducing proppant density we can use hydraulic fracturing fluid applied for filling the fractures with proppants where such fluid has a lower viscosity, that cuts the price for the fluid and reduces the likelihood that the hydraulic fracturing fluid residual in a formation would block flows of oil and gas preventing them from coming over to the well. When proppant density is lower, the process of pumping proppants into a well is getting cheaper and easier and the proppant itself can penetrate into the fracture more deeply improving oil and gas well production rates.

Those skilled in the art know a method for making lightweight proppants from metasilicates of calcium and/or magnesium including step-by-step grinding, blending with modifying and sintering additives, i.e. titanium oxide, zirconium silicate, pelletizing green proppants up to bulk density not less than 1.2 g/cm$^3$ and calcinating at temperature of 1215-1290° C., and, correspondingly, proppants produced by this method (Patent RF No. 2235702, published on Oct. 9, 2004)

One of the disadvantages of the known method and proppants is that such proppants possess low grindability and binding properties of metasilicates and as a result—insufficient strength. Due to such deficiency the material—when being fed to drying and calcination areas—is partially broken, that leads to considerable dust formation and reduction in proppant strength properties, for the compensation of which it is necessary to use expensive adhesive and sintering additives, which in its turn would lead to more expensive production. Besides, one of the drawbacks is also that the produced proppant has significant bulk density.

Also known is a method for making lightweight magnesium silicate proppants from magnesium silicate material based on forsterite where the content of the latter is 55-80%. Such method includes calcination of serpentine crushed stone at temperature not less than 1070 degrees C., and then its consequent grinding with the additions of tripolite (diatomite), granite, fly-ash, pelletizing of the batch and its calcination at temperature 1150-1350 degrees C., and, correspondingly, a proppant produced by the method. (Patent RF No. 2235703, published on Oct. 9, 2004)

Still the above proppant has some disadvantages. One of them is low mechanical strength and high bulk density associated with the fact that the basic crystalline phase if forsterite. Another deficiency is that there is a need in two-fold high temperature calcination of the basic bulk of the material, which contributes to a rise in its cost.

The invention aims to reduce bulk density of sintered proppant pellets with increasing their strength and to enhance the strength of the green proppant pellets.

The given effect is achieved due to a method for the production of a light-weight magnesium silicate proppant, the method comprising heat processing of magnesium-containing component—the source of magnesium oxide, its co-grinding with silica-containing component, pelletizing of the batch produced, sintering and sieving of the pellets produced, wherein the batch comprises (in terms of calcined substance), in % by weight:

| | |
|---|---|
| SiO$_2$ | 64-72 |
| MgO | 11-18 |
| natural impurities- | remainder, | wherein said heat processing is performed at temperature not more than 1080° C.

The given effect is achieved also by a lightweight magnesium silicate proppant produced by the above method.

Among other things, said magnesium-containing component includes at least one of the group including: serpentine, brucite, caustic magnesite, talc. Components may include serpentine gravel (crushed stone) and quartz-feldspar sand at the following ratio, % by weight: serpentine gravel 30-40, quartz-feldspar sand 60-70, and said sintering is carried out at temperature 1140-1190° C.

A material, which is a source of magnesium oxide may comprise: brucite, serpentine, caustic magnesite, talc or their mixtures provided that the above mentioned chemical composition of the batch material is adhered to. However, the application of said serpentine gravel (crushed stone) is preferable because along with magnesium metasilicate and silica, a low-strength forsterite phase is formed in the compositions having a free magnesium oxide when carrying out said heat processing—sintering firing.

Various kinds of silica-containing materials, such as: various quartz-bearing sands, silica rocks, silica industrial wastes may be used as the silica-containing components. The preferable components, among the above mentioned, are quartz-feldspar sands and quartz sands.

Serpentine gravels and quartz-feldspar sands of various deposits are different by their chemical composition, thus, the basic factors having an influence on the proppant characteristics are the ratios of said batch components and the ratio MgO/SiO$_2$ in the proppant. It is important to note that natural occurring inclusions contained in the batch, i.e. Al$_2$O$_3$, Na$_2$O, K$_2$O, Fe$_2$O$_3$ and others, do not exercise definitive influence on the properties of a product manufactured within the technical solution according to the invention.

It was established that the ground physical preparation from quartz-feldspar sand dried, as a rule, up to residual water content not more than 3%, and serpentine subjected to heat processing at temperature not more than 1080° C., taken at the claimed ratio, have pronounced binding properties. As a result, the resistance to mechanical stresses of the green pellets is considerably increased, and the dust generation during their classification and sintering in a revolving kiln is unlikely. It should be noted that the quality of, the bulk mass granulation based on partly hydrated magnesium silicates is much higher: sphericity and roundness are enhanced both for green and sintered pellets, which in the end contribute to the improvement of the proppant strength properties. When using serpentine, which was subject to heat processing under temperature not more than 1080° C., it is possible to avoid considerable recrystallization of the material grain under sintering firing. Besides, the application of so-called partly-hydrated magnesium silicates enables to optimize fine grinding of the feed material, such hydrated materials are ground 3-4 times as fast compared to their calcinated equivalents or specially prepared sinters of batch components. As a result, more homogeneous mixtures with developed surfaces are fed to granulation. High homogeneity of the batch makes it possible to reduce the temperature of sintering said green pellets to 1140-1190° C. Low sintering temperatures and high homogeneity of the batch have produced an unexpected effect—upon sintering proppants the ceramic structure does not practically have a forsterite phase (less than 5%), lowering the performance characteristics of the proppants. The increase in heat processing temperature for magnesium-containing feed components above 1080 degrees C. will lead to the deterioration of the above parameters.

During the sintering of said green proppants at temperatures below 1140 degrees C. the material will remain mainly underburnt having low strength whereas an increase in the sintering temperature above 1190 degrees C. will result in the production of a large number of sinters and in the increase of low-strength forsterite and protoenstatite phase content of the ceramic.

The reduction of the bulk density of the sintered proppant granules is dependent on the composition of the material implying reduced content of magnesium silicate. The increase in the serpentine by more than 40% by weight (MgO more than 18% by weight) and decrease in the amount of quartz feldspar sand by less than 60% by weight ($SiO_2$ less than 64% by weight) will lead to the boost in the proppant bulk density. Provided that the serpentine content is less than 30% by weight (MgO less than 11% by weight) and content of quartz-feldspar sand is more than 70% by weight ($SiO_2$ more than 72% by weight), the material will have a narrow temperature range for the sintering firing of the pelletized feed material green pellets, at which point a significant number of sinters can be produced.

As a result of the claimed method the proppants characterized by low bulk weight and considerable strength have been made. The authors of the invention have assumed that regarding the material of the claimed composition received by the claimed method they managed to implement transformational strengthening mechanisms based on a clinoenstatite phase change developed in ceramics during their sintering. The structure of pellets is a glass phase of a variable composition comprising distributed within the phase microparticles of clinoenstatite with monoclinic system, which will transform into the rhombic when external forces are applied. Thus, cracks developing inside a pellet and colliding on its route with a monoclinic clinoenstatite particle will lose its energy in the monoclinic-rhombic transition and as a result the resistance of the material to crushing loads will be enhanced. Moreover, the less the size of the particles passed through polymorphic transformation is, the larger part of them is found in unit per volume of the material, and subsequently in the area where a fracture is extended.

EXAMPLES OF EMBODIMENTS

Example 1

Dried to humidity of 3% quartz-feldspar sand and serpentine gravel subjected to pre-heating, at a ratio of gravel—35% by weight, sand—65% by weight were fed into a laboratory vibration mill for co-grinding and milling into fractions of 40 μm and less (residue on sieve No. 004 was less than 1%). Then the batch was pelletized. The resulting pelletized fractions of $^{40}/_{70}$ mesh were measured with respect to the strength of said green pellets evaluated as crushing loads applied to a singular grain and expressed in grams. Subsequently the green pellets were sintered at temperature 1150° C. and sieved. The sintered proppant bulk weight and pellet strength were determined under standard practice ISO 13503-2:2006(E). In addition, samples of proppants were prepared with a different ratio between dried sand and serpentine gravel where the gravel was subject to pre-heat treatment at various temperatures.

Example 2

Dried to humidity of 3% quartz-feldspar sand—85% by weight and caustic magnesite—15% by weight were fed into laboratory vibration mill for co-grinding and milling into fractions of 40 μm and less (residue on sieve No. 004 less than 1%). Then the batch was pelletized. The resulting granulated fractions of $^{40}/_{70}$ mesh were measured with respect to the strength of said green pellets evaluated as crushing loads applied to a singular grain and expressed in grams. Subsequently the green pellets were sintered at temperature 1130 degrees C. and sieved. Finally the sintered proppant bulk weight and pellet strength were determined under standard practice ISO 13503-2:2006(E).

The results of measurements are disclosed in Table 1.

TABLE 1

| | Results of conducted measurements | | | |
|---|---|---|---|---|
| Batch composition, NN % by weight | Heat treatment temperature for batch components, °C. | Green pellet strength, in grams | Sintered proppant bulk weight, g/cm3 | Sintered proppant crushability in % at 10000 psi. |
| 1 Forsterite proppant according to Patent RF No. 2235703 | 1100 | 11 | 1.6 | 4.3 |
| 2 Proppant based on magnesium metasilicate as per Patent RF No. 2235702 | 1100 | 14 | 1.5 | 3.7 |
| 3 Serpentine gravel - 30, quartz-feldspar sand- 70 (MgO≈11, $SiO_2$≈72, impurities - 17) | 900 | 28 | 1.42 | 1.3 |
| 4 Serpentine gravel - 35, quartz-feldspar sand- | 1000 | 26 | 1.42 | 1.4 |

TABLE 1-continued

Results of conducted measurements

| NN | Batch composition, % by weight | Heat treatment temperature for batch components, °C. | Green pellet strength, in grams | Sintered proppant bulk weight, g/cm3 | Sintered proppant crushability in % at 10000 psi. |
|---|---|---|---|---|---|
|  | 65 (MgO≈15, SiO$_2$≈67, impurities - 18) |  |  |  |  |
| 5 | Serpentine gravel-40, quartz-feldspar sand-60 (MgO≈18, SiO$_2$≈64, impurities-18) | 1080 | 24 | 1.42 | 1.5 |
| 6 | Serpentine gravel - 25, quartz-feldspar sand-75 (MgO≈10, SiO$_2$≈73, impurities - 18) | 1080 | 17 | Proppant sinters are formed | — |
| 7 | Serpentine gravel - 45, quartz feldspar sand-55 (MgO≈19, SiO$_2$≈63, impurities - 18) | 1080 | 19 | 1.51 | 2.3 |
| 8 | Serpentine gravel - 35, quartz-feldspar sand-65 (MgO≈15, SiO$_2$≈67, impurities - 18) | Drying to humidity 3% | 38 | 1.42 | 1.0 |
| 9 | Serpentine gravel - 35, quartz-feldspar sand-65 (MgO≈15, SiO$_2$≈67, impurities - 18) | 250 | 36 | 1.42 | 1.1 |
| 10 | Serpentine gravel - 35, quartz-feldspar sand-65 (MgO≈15, SiO$_2$≈67, inclusions - 18) | 600 | 33 | 1.42 | 1.2 |
| 11 | Serpentine gravel - 35, quartz feldspar sand-65 (MgO≈15, SiO$_2$≈67, impurities - 18) | 1100 | 14 | 1.45 | 2.5 |
| 12 | Caustic magnesite - 15, quartz-feldspar sand-85 (MgO≈15, SiO$_2$≈69, impurities - 16) | — | 18 | 1.43 | 1.8 |

The analysis of the data in the above table shows that the method for the production of a lightweight magnesium silicate proppant and a proppant according to the invention enable to make a product (examples 3-5, 8-10) with enhanced strength of green pellets, reduced bulk density and with strength of a sintered proppant more enhanced than that of known analogues.

The invention claimed is:

1. A method for the production of a lightweight magnesium silicate proppant, the method comprising heat processing of a magnesium-containing component—a source of magnesium oxide, its co-grinding with a silica-containing component, pelletizing of the batch prepared, sintering and sieving of the pellets prepared, wherein the batch comprises (in terms of calcined substance), in % by weight:

| SiO$_2$- | 64-72 |
| MgO- | 11-18, |
| natural impurities- | remainder, | wherein the heat processing is carried out at temperature not more than 1080 degrees C.

2. The method according to claim 1, wherein said magnesium-containing component comprises at least one of the group: serpentine, brucite, caustic magnesite, talc.

3. The method according to claim 1, wherein said components comprise serpentine gravel and quartz-feldspar sand at the following ratio, in percent by weight:

| serpentine gravel- | 30-40 |
| quartz-feldspar sand- | 60-70. |

4. The method according to claim 1, wherein the sintering is performed at temperature 1140-1190 degrees C.

5. A lightweight magnesium silicate proppant, wherein the proppant is produced by the method of claim 1.

6. The proppant according to claim 5, wherein said magnesium-containing component comprises at least one of the group: serpentine, brucite, caustic magnesite, talc.

7. The proppant according to claim 5, wherein said components comprise serpentine gravel and quartz-feldspar sand at the following ratio, in percent by weight:

| serpentine gravel- | 30-40 |
| quartz-feldspar sand- | 60-70 |

8. The proppant according to claim 5, wherein the sintering is performed at temperature 1140-1190 degrees C.

* * * * *